(12) United States Patent
Oikaze et al.

(10) Patent No.: US 8,619,263 B2
(45) Date of Patent: Dec. 31, 2013

(54) FILM THICKNESS MEASURING APPARATUS USING INTERFERENCE AND FILM THICKNESS MEASURING METHOD USING INTERFERENCE

(75) Inventors: Hirotoshi Oikaze, Hyogo (JP); Takashi Urashima, Fukuoka (JP)

(73) Assignee: Panasonic Corporation, Osaka (JP)

( * ) Notice: Subject to any disclaimer, the term of this patent is extended or adjusted under 35 U.S.C. 154(b) by 222 days.

(21) Appl. No.: 13/266,832

(22) PCT Filed: Dec. 22, 2010

(86) PCT No.: PCT/JP2010/007439
§ 371 (c)(1),
(2), (4) Date: Oct. 28, 2011

(87) PCT Pub. No.: WO2011/083544
PCT Pub. Date: Jul. 14, 2011

(65) Prior Publication Data
US 2012/0044501 A1    Feb. 23, 2012

(30) Foreign Application Priority Data
Jan. 6, 2010 (JP) .................................. 2010-000955

(51) Int. Cl.
*G01B 11/02* (2006.01)

(52) U.S. Cl.
USPC .......................................................... 356/503

(58) Field of Classification Search
USPC .......................... 356/497, 503, 504, 630, 632
See application file for complete search history.

(56) References Cited

U.S. PATENT DOCUMENTS

| | | | |
|---|---|---|---|
| 5,398,113 A | 3/1995 | de Groot | |
| 6,654,129 B1 * | 11/2003 | Uda et al. | 356/504 |
| 6,900,900 B2 * | 5/2005 | McMillen et al. | 356/504 |
| 8,112,146 B2 * | 2/2012 | Hart et al. | 600/476 |
| 2005/0206907 A1 * | 9/2005 | Fujimoto et al. | 356/504 |
| 2007/0046953 A1 | 3/2007 | De Groot et al. | |
| 2010/0091284 A1 * | 4/2010 | Mieher et al. | 356/401 |

FOREIGN PATENT DOCUMENTS

| | | |
|---|---|---|
| JP | 62-259006 | 11/1987 |
| JP | 64-57108 | 3/1989 |
| JP | 8-502829 | 3/1996 |
| JP | 2008-299210 | 12/2008 |
| JP | 2009-516171 | 4/2009 |

OTHER PUBLICATIONS

International Search Report issued Mar. 29, 2011 in International (PCT) Application No. PCT/JP2010/007439.
Translation of International Preliminary Report on Patentability issued Aug. 14, 2012 in International (PCT) Application No. PCT/JP2010/007439.

* cited by examiner

*Primary Examiner* — Michael A Lyons
(74) *Attorney, Agent, or Firm* — Wenderoth, Lind & Ponack, L.L.P.

(57) ABSTRACT

With a film thickness measuring apparatus of the present invention, a substrate having a transparent film formed on its front surface is placed on a placement unit. A half mirror divides light from a light source such that divided light beams are emitted to the front surface of the substrate and to a reference plane, and overlays reflected light from the front surface of the substrate and reflected light from the reference plane on each other to form interfering light. The interfering light is imaged by an imager. Based on the imaging result, the film thickness of the transparent film is calculated by an arithmetic unit. An optical filter with which an intensity spectrum of transmitted light exhibits a plurality of peaks, the optical filter is disposed between the light source and the half mirror.

9 Claims, 21 Drawing Sheets

Fig.8A

| NUMBER OF PEAKS | 1 | 2 | 3 | 4 |
|---|---|---|---|---|
| WAVELENGTH DISTRIBUTION HORIZONTAL AXIS: WAVELENGTH (nm) VERTICAL AXIS: RELATIVE INTENSITY | FIG.8B | FIG.8E | FIG.8H | FIG.8K |
| LUMINANCE SIGNAL HORIZONTAL AXIS: Z POSITION (nm) VERTICAL AXIS: LUMINANCE | FIG.8C | FIG.8F | FIG.8I | FIG.8L |
| NONLINEAR COMPONENT (REPEATED FOR ONE THOUSAND TIMES IN NOISE ENVIRONMENT) HORIZONTAL AXIS: WAVELENGTH (nm) VERTICAL AXIS: PHASE (rad) | FIG.8D | FIG.8G | FIG.8J | FIG.8M |
| SUM OF ERROR VALUES | 0.0023 | 0.0014 | 0.00056 | 0.00060 |

Fig.8B

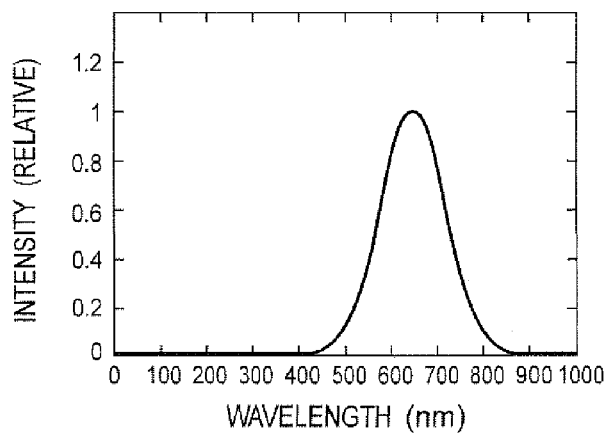

Fig.9A

| | | | | | |
|---|---|---|---|---|---|
| | PROPORTION OF INTENSITY OF CENTRAL PEAK TO INTENSITY OF OPPOSITE SIDES' PEAKS | 81.5% | 88.4% | 93.4% | 96.8% | 99.0% |
| PHASE SIGNAL VARIATION HORIZONTAL AXIS: WAVELENGTH (nm) VERTICAL AXIS: PHASE (rad) | FIG.9B | FIG.9D | FIG.9F | FIG.9H | FIG.9J |
| WAVELENGTH DISTRIBUTION HORIZONTAL AXIS: WAVELENGTH (nm) VERTICAL AXIS: RELATIVE INTENSITY | FIG.9C | FIG.9E | FIG.9G | FIG.9I | FIG.9K |
| ERROR VALUE | 0.00047 | 0.00047 | 0.00039 | 0.00041 | 0.00056 |

FILM THICKNESS MEASURING APPARATUS USING INTERFERENCE AND FILM THICKNESS MEASURING METHOD USING INTERFERENCE

TECHNICAL FIELD

The present invention relates to a film thickness measuring apparatus using interference and a film thickness measuring method using interference.

BACKGROUND ART

A white-light scanning interferometer is an optical system as shown in FIG. 10. In FIG. 10, a white-light source 1101 is a light source such as a halogen lamp, which emits light of wide-band wavelength distribution. The white light emitted from the white-light source 1101 enters a half mirror 1102. The half mirror 1102 divides the light, and guides the divided light beams to a sample 1103 and to a reference plane 1104, respectively. These light beams are incident upon the sample 1103 and the reference plane 1104 and reflected off therefrom, respectively, and then again overlaid on each other at the half mirror 1102. The overlaid light becomes incident upon an area sensor 1105. At this time, the area sensor 1105 captures images while scanning the reference plane 1104 in a direction of an arrow 1110 in the figure. The light being incident upon is converted into an image, and captured by an arithmetic unit 1106.

Next, with reference to a flowchart shown in FIG. 11, a description will be given of a procedure of measuring the film-thickness distribution using such an apparatus. It is to be noted that, the sample 1103 includes therein a first interface and a second interface.

In FIG. 11, first, in step S201, an image is captured while scanning the reference plane 1104 by the optical system shown in FIG. 10, to extract a luminance change in each pixel of the image. Thus, an interference waveform at each pixel is detected.

Subsequently, in step S202, a peak position of each interference waveform with reflected light at the first interface is calculated. Here, as a method for calculating the peak position, what is used is a method including: calculating an envelope by a low-pass filter, for example; and detecting a scanning position that assumes the maximum value thereof.

Subsequently, in step S203, a peak position of each interference waveform with reflected light at the second interface is calculated.

Subsequently, in step S204, a distance of the reference plane 1104 at the two peak positions calculated in steps S202 and S203 is calculated, and the distance is divided by the refractive index. Thus, the film thickness is calculated.

Finally, in step S205, the calculation result of the film thickness is output, and the measurement ends.

In the foregoing manner, white light is emitted to the sample 1103 and the light reflected off is overlaid on the light reflected off the reference plane 1104, to form an image on the area sensor 1105. As a result, interference fringes appear at a portion on the area sensor 1105 where a distance Z from the half mirror 1102 to the reference plane 1104 and a distance h from the half mirror 1102 to the sample 1103 are equal to each other. With the optical system, when the reference plane 1104 is scanned in the arrow 1110 direction, an interference waveform appears at each measurement point. By detecting the peak of the interference waveform at each measurement point and coupling together, an interference waveform over the entire surface sample 1103 can be obtained. Then, based on the interference waveform, a surface shape distribution of the object is measured. Further, with use of this technique, film thickness measurement of a transparent body can be carried out.

In a case where a transparent film is selected as the sample 1103, as shown in FIG. 12A, reflected light 1112 at a front surface 1111 (the first interface) and reflected light 1114 at a back surface 1113 (the second interface) exist. When the optical system is scanned in a depth direction of the sample 1103, these light beams form separate interference fringes, and a measurement result shown in FIG. 12B is obtained. Since the peak interval of the measurement result corresponds to a thickness t of the sample 1103, the thickness can be measured in a range in which superimposition of interference fringes does not occur.

In this measurement scheme, it is preferable to use the white-light source 1101 with which a coherence length being a range in which interference fringes appear becomes the shortest. Specifically, it is preferable that the intensity spectrum of the white-light source 1101 has the widest possible band, and attains the normal distribution. Accordingly, as the white-light source 1101, a wide-band light source such as a halogen lamp is used, and a filter having a wavelength dependency on the transmittance of light is inserted immediately behind the white-light source 1101 (for example, see Patent Document 1).

Here, in a case where the sample 1115 is structured with a plurality of transparent films 1116 and 1117, and a halogen lamp is employed as the white-light source 1101, the coherence length becomes equal to or more than 1 μm. Therefore, when the film thickness of the sample 1103 is equal to or less than 1 μm, as shown in FIGS. 13A and 13B, superimposition of the interference waveform occurs between the interface 1118 between the transparent film layer 1116 and the transparent film layer 1117 and the interface 1119 between the transparent film layer 1117 and the lower layer thereof.

PRIOR ART DOCUMENT

Patent Document

Japanese Unexamined Patent Publication No. 62-259006

SUMMARY OF THE INVENTION

Issues to be Resolved by the Invention

However, with the conventional structure described above, as shown in FIGS. 13A and 13B, when the superimposition of the interference waveform occurs, the film-thickness distribution measurement of the sample front surface cannot be carried out.

Further, with the conventional structure described above, precision of measurement may be impaired under the effect of vibration noises or electrical noises, which may be involved at the time of capturing an image of the area sensor while scanning the reference plane.

Means for Resolving the Issues

The first aspect of the present invention provides a film thickness measuring apparatus using interference, including:

a placement unit on which a substrate is placed, the substrate having a transparent film formed on its front surface;

a light source that emits light to the substrate placed on the placement unit;

a half mirror that divides the light from the light source to be emitted to the front surface of the substrate and to a reference plane, and that overlay reflected light from the front surface of the substrate and reflected light from the reference plane to form interfering light;

an imager that images the interfering light; and an arithmetic unit that calculates a film thickness of the transparent film based on an imaging result obtained by the imager, wherein the arithmetic unit includes:

a spectrum change amount database that is created by previously compiling a database of a change amount of a first phase spectrum between incident light upon the transparent film and reflected light from the transparent film;

a second phase spectrum calculating unit that calculates a second phase spectrum of the transparent film by applying Fourier transform to an interference signal of the transparent film imaged by the imager; and a film thickness calculating unit that selects a best matching first phase spectrum to the second phase spectrum from the spectrum change amount database, and that measures the film thickness of the transparent film using the best matching first phase spectrum.

The second aspect of the present invention provides: a film thickness measuring method using interference, including:

creating a spectrum change amount database by previously compiling a change amount of a first phase spectrum between incident light upon a substrate having a transparent film formed on its front surface and reflected light from the substrate;

calculating a second phase spectrum of the transparent film by applying Fourier transform to an interference signal of interfering light produced by interference of light from the transparent film and light from the reference plane; and selecting a best matching first phase spectrum to the second phase spectrum from the spectrum change amount database, and measuring a film thickness of the transparent film using the best matching first phase spectrum.

Effects of the Invention

As described above, according to the present invention, the film-thickness distribution as to the film thickness of an object provided with a thin film equal to or less than 1 µm on its front surface can precisely be measured.

BRIEF DESCRIPTION OF THE DRAWINGS

These and other aspects and features of the present invention will become clear from the following description taken in conjunction with the preferred embodiments thereof with reference to the accompanying drawings, in which:

FIG. 8A is a view showing a variation evaluation result of a nonlinear component due to a change in the number of peaks of the intensity spectrum of light after transmitting through the wavelength filter according to the second embodiment;

FIG. 8B is a graph of a waveform distribution in which the number of peaks is one, being one of the views showing the variation evaluation result of the nonlinear component due to a change in the number of peaks of the intensity spectrum of light after transmitting through the wavelength filter according to the second embodiment;

FIG. 9A is a view showing a variation evaluation of a nonlinear component in a case where the proportion between the central peak and the opposite sides' peaks is changed when the intensity spectrum of light after transmitting through the wavelength filter according to the second embodiment has three peaks;

DESCRIPTION OF EMBODIMENTS

Figure 1A:
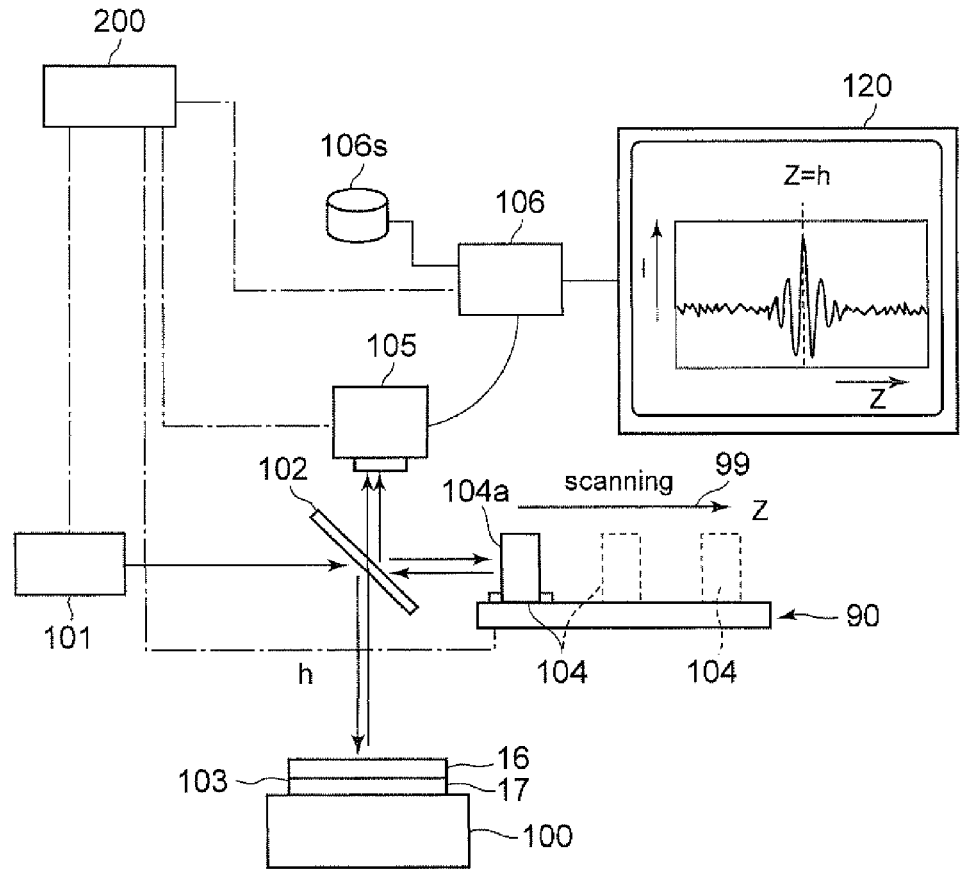
FIG. 1A is a schematic configuration view of an optical system of a white-light scanning interferometer according to a first embodiment of the present invention.
Figure 1B:
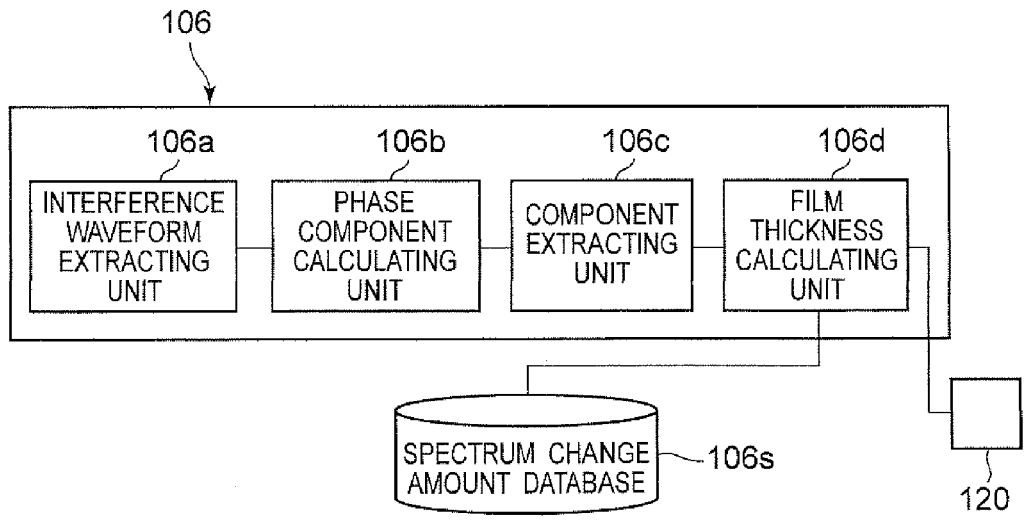
FIG. 1B is a block diagram of an arithmetic unit of the optical system of the white-light scanning interferometer according to the first embodiment of the present invention.
Figure 1C:
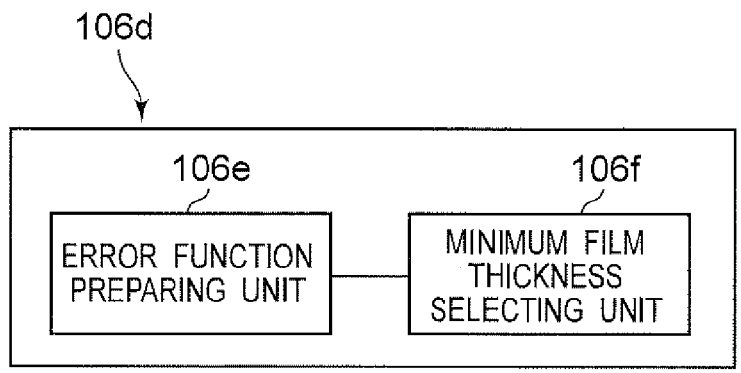
FIG. 1C is a block diagram of a film thickness calculating unit of the optical system of the white-light scanning interferometer according to the first embodiment of the present invention.

In the following, with reference to the drawings, a description will be given of embodiments of the present invention. It is to be noted that, in the following description, the same structure is denoted by the identical reference character, and description thereof is omitted as appropriate.

First Embodiment

A white-light scanning interferometer 1 as one example of a film thickness measuring apparatus according to a first embodiment of the present invention is the optical system shown in FIG. 1A. The white-light scanning interferometer 1 is structured with a white-light source 101 as one example of the light source, a half mirror 102, a placement unit 100, a reference member 104 having a reference plane 104a, an area sensor 105 as one example of the imager, and an arithmetic unit 106.

In FIG. 1A, the white-light source 101 is a light source such as a halogen lamp, which emits light of a wide-band wavelength distribution. The white-light source 101 causes the white light to be incident upon the half mirror 102.

The half mirror 102 divides the light, and guides the divided light beams to the sample 103 placed on the placement unit 100 and to the reference member 104, respectively. The sample 103 is a substrate, in which a transparent film 16 being a measurement target is formed on the front surface of a base 17. These light beams become incident upon the sample 103 and the reference member 104, respectively, and are reflected off the front surface of the sample 103 and off the reference plane 104a, respectively. Thereafter, they are again overlaid on each other at the half mirror 102. The overlaid light becomes incident upon the area sensor 105. At this time, while the reference plane 104a is scanned in an arrow 99 direction in FIG. 1A using a reference member shifting apparatus 90, an image at the reference plane 104a is captured by the area sensor 105. The reference member shifting apparatus 90 is a driver mechanism that linearly shifts the reference member 104 along the arrow 99. What is used as the driver mechanism is, for example, a driver mechanism that linearly shifts the reference member 104 held by a nut member screwed with a ball screw along the arrow 99 by rotating the ball screw by a motor, or a driver mechanism that linearly shifts the reference member 104 along the arrow 99 by a linear motor.

The light being incident upon the area sensor 105 is converted into an image by the area sensor 105.

Information on the image converted by the area sensor is captured by the arithmetic unit 106. The arithmetic unit 106 performs an arithmetic operation for measuring the film-thickness distribution while referring to a spectrum change amount database 106s. The measurement of the film-thickness distribution by the arithmetic unit 106 will be detailed later. The arithmetic unit 106 is structured with an interference waveform extracting unit 106a, a phase component calculating unit 106b as one example of the second phase spectrum calculating unit, a component extracting unit 106c, and a' film thickness calculating unit 106d. Further, the film thickness calculating unit 106d is structured with an error function preparing unit 106e and a minimum film thickness selecting unit 106f.

The arithmetic unit 106 performs the following arithmetic operations. First, the arithmetic unit 106 applies Fourier transform to the interference signal of the transparent film imaged by the area sensor 105, to calculate the second phase spectrum of the transparent film at the phase component calculating unit 106b. Then, the arithmetic unit 106 selects the first phase spectrum that best matches the second phase spectrum from the spectrum change amount database 106s. Then, the arithmetic unit 106 measures the film thickness of the transparent film at the film thickness calculating unit 106d with use of the best matching first phase spectrum selected.

A control apparatus 200 is connected to the white-light source 101, the area sensor 105, the arithmetic unit 106, the reference member shifting apparatus 90, and the like, to control their respective operations, such that the film-thickness distribution of the sample 103 is measured.

Figure 2:
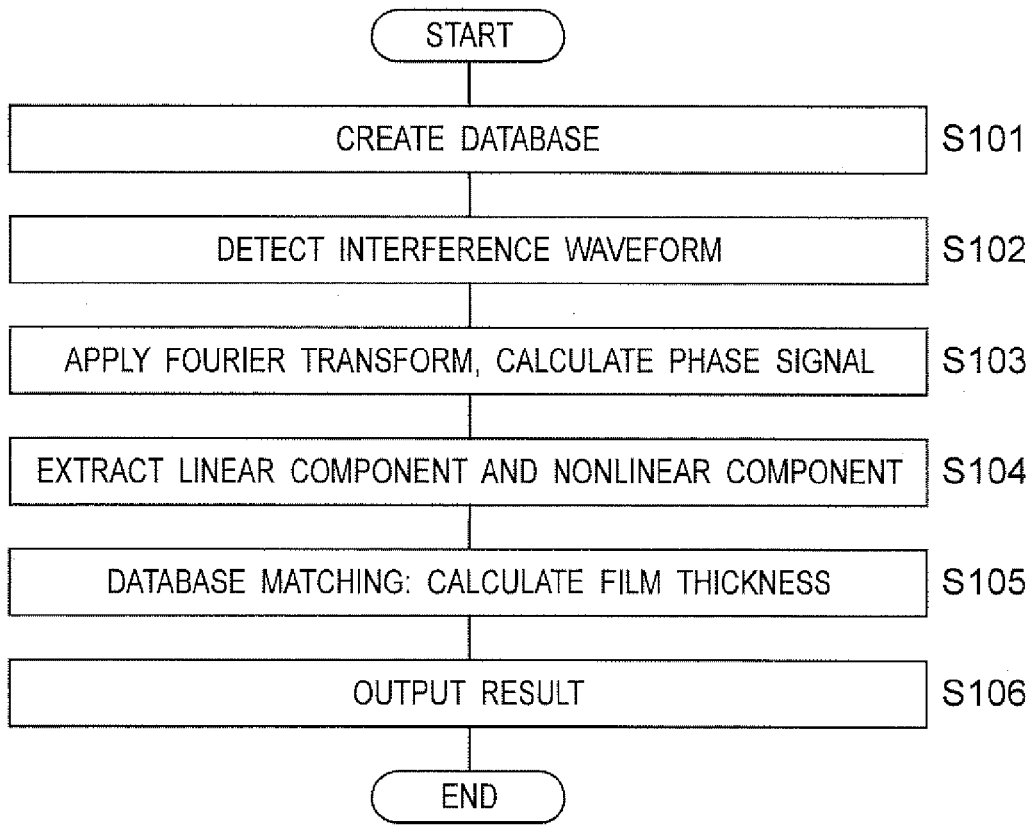
FIG. 2 is a flowchart showing a measurement procedure of a film-thickness distribution according to the first embodiment.

Next, with reference to the flowchart of FIG. 2, a description will be given of a procedure of performing measurement of the film-thickness distribution with use of the white-light scanning interferometer 1.

First, in step S101, for each of a plurality of types of film thickness, a change amount of the phase spectrum (first phase spectrum) of reflected light with reference to incident light is calculated, to create a database for a plurality of types of film thickness. Then, the created database for a plurality of types of film thickness is stored in the spectrum change amount database 106s that can be referred to by the arithmetic unit 106. The work of creating the database and storing it in the spectrum change amount database 106s that can be referred to is carried out by the arithmetic unit 106 under control of the control apparatus 200.

As to the interference signal in white-light scanning interference, since the light being emitted is white light, interference waves of various wavelengths are superimposed on one another. As a result of the interference waves of various wavelengths being overlaid on one another, an interference waveform is generated by the cancellation among one another. This is mathematically represented by the following (Equation 1).

$$I(z) = \sum_\lambda I_0(\lambda) + I_1 \exp\left(-i\frac{4\pi}{\lambda}(z-h)\right) \quad \text{(Equation 1)}$$

Where $I_0$ and $I_1$ are each an intensity of the interference signal; $\lambda$ is a wavelength of light being emitted; z is a scanning position of the optical system; and h is a distance from the half mirror to the transparent body front surface. I (z) is the interference signal at the scanning position z of the optical system. In (Equation 1), i is an imaginary unit.

Applying Fourier transform to an interference signal and extracting the phase term thereof, the obtained phase signal $\phi$ is represented by the following (Equation 2). Here, the phase signal $\phi$ becomes a linear function having a gradient ($2\pi h$).

$$\phi = (2\pi h) \times \frac{2}{\lambda} \quad \text{(Equation 2)}$$

Figure 3:
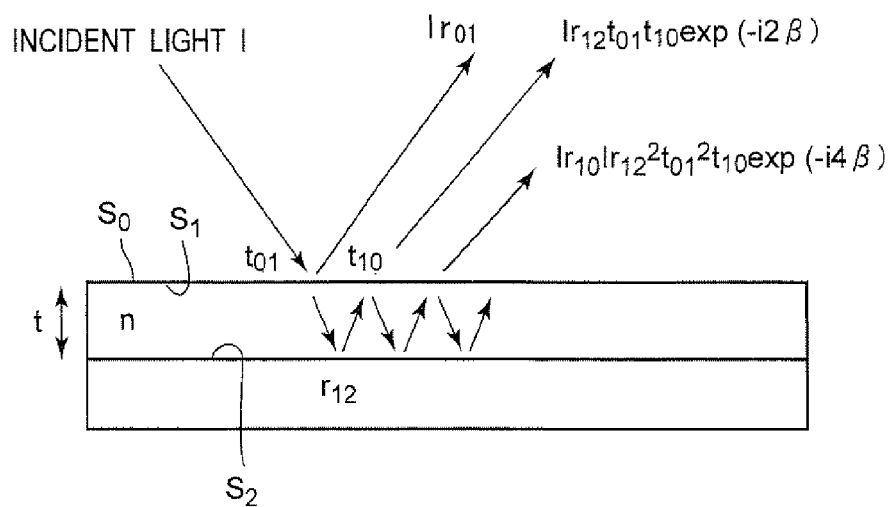
FIG. 3 is a view showing the manner of multiple reflection with a thin film according to the first embodiment.

The above-stated (Equation 2) is a phase signal $\phi$ where no transparent film is present on the front surface of the sample 103. Here, in a case where the transparent film 16 whose film thickness is t and whose refractive index is n exists on the front surface of the sample 103, multiple reflection shown in FIG. 3 occurs. Here, $t_{ij}$ is an amplitude transmittance of light being incident from an i plane upon a j plane of the sample 103 (where i is an integer equal to or more than 0, being an integer equal to or more than 1, and i<j); $r_{ij}$ is an amplitude reflectivity of light being incident from an i plane toward a j plane; and β is a phase change amount $\xi=2\pi nt/\lambda$ of the transparent film. For example, $t_{10}$ is an amplitude transmittance of light being incident from $S_0$ plane toward $S_1$ plane of the sample 103. $t_{10}$ is an amplitude transmittance of light being incident from $S_1$ plane toward $S_0$ plane of the sample 103. $r_{01}$ is an amplitude reflectivity of light being incident from $S_0$ plane toward $S_1$ plane. $r_{12}$ is an amplitude reflectivity of light being incident from $S_1$ plane toward $S_2$ plane. $r_{10}$ is an amplitude reflectivity of light being incident from $S_1$ plane toward $S_0$ plane.

When a total sum of light reflected off the transparent film 16 of the sample 103 is obtained, to obtain the spectrum of the entire phase change amount, the following (Equation 3) and (Equation 4) are obtained.

$$I = Ir_{01} + It_{01}t_{10}r_{12}\exp(-i2\xi) + \ldots \quad \text{(Equation 3)}$$
$$= \frac{r_{01} + r_{12}\exp(-i2\xi)}{1 + r_{01}r_{12}\exp(-i2\xi)} I \equiv r_{012}e^{i\theta}I$$

$$\theta = \arctan\left(\frac{r_{12}(1-r_{01}^2)\sin(2\beta)}{r_{01}(1+r_{12}^2) + r_{12}(1+r_{01}^2)\cos(2\beta)}\right) \quad \text{(Equation 4)}$$

Finally, the phase in a case where the transparent film 16 is present at the sample 103 changes from the foregoing (Equation 2) to be the following (Equation 5).

$$\phi = (2\pi h) \times \frac{2}{\lambda} + \theta(\lambda) \quad \text{(Equation 5)}$$

θ includes a nonlinear component, and the above-stated (Equation 5) is not a linear function as shown in FIG. 7. Assuming that $\theta=\alpha\times(2/\lambda)+\beta$, and separating between a linear component $\{\alpha\times(2/\lambda)\}$ and a nonlinear component β, the above-stated (Equation 5) becomes the following (Equation 6).

$$\phi = (2\pi h + \alpha) \times \frac{2}{\lambda} + \beta \quad \text{(Equation 6)}$$

Here, the nonlinear component β of θ is dependent just on the film thickness and the refractive index of the transparent film 16, and not dependent on the height of the front surface of the transparent film 16. β is derived for the film thickness assumed for the transparent film 16 by a theoretical calculation, and the database is previously created and stored in the spectrum change amount database 106s. Then, the nonlinear component of the phase signal actually obtained is subjected to matching against the information stored in the spectrum change amount database 106s. Thus, the waveform with the smallest error is extracted. Thus, the film thickness of the transparent film 16 can be measured.

In the foregoing, the description has been given of the most simple single-layer film. However, it is also possible to create a database for multi-layer films, store it in the spectrum change amount database 106s, and measure the film thickness of each multi-layer film. It is to be noted that, in measuring the film thickness of a multi-layer film, the theory of calculating the reflectivity of a general multi-layer film is used.

Further, in the foregoing, it has been described that the database based on a theoretical calculation is created. However, by an actual measurement of a sample having a known film thickness as the standard (or the reference), the database of the nonlinear component β may be created. The database of the nonlinear component β created based on such actual measurement is stored in the spectrum change amount database 106s.

Subsequently, in step S102, while the reference plane 104a is scanned by the optical system shown in FIG. 1A, an image is captured in the arithmetic unit 106 through the area sensor 105. Then, the luminance change in each pixel of the image captured in the arithmetic unit 106 is extracted by the interference waveform extracting unit 106a of the arithmetic unit 106. In this manner, the interference waveform at each pixel of the image is detected by the interference waveform extracting unit 106a. It is to be noted that, after creating the database in step S101, step S101 can be skipped for the sample 103 that can use the same database. In this case, step S101 is skipped, and the steps following step S102 are repeated.

Subsequently, in step S103, to the interference waveform in each pixel detected in step S102, Fourier transform is applied by the phase component calculating unit (one example of the second phase spectrum calculating unit) 106b of the arithmetic unit 106. Then, each phase component as the second phase spectrum is calculated by the phase component calculating unit 106b.

Subsequently, in step S104, for each pixel, linear fitting is applied to the phase signal calculated in step S103 at the component extracting unit 106c of the arithmetic unit 106. Then, the linear component and the nonlinear component are extracted by the component extracting unit 106c.

Subsequently, in step S105, for each pixel, matching of the nonlinear component extracted in step S104 and the information in the spectrum change amount database 106s structured in step S101 against each other is carried out by the film thickness calculating unit 106d of the arithmetic unit 106. Further, out of all the waveforms in the spectrum change amount database 106s, the waveform that is closest to the nonlinear component is detected by the film thickness calculating unit 106d (in other words, the best matching first phase spectrum to the second phase spectrum is selected from the spectrum change amount database 106s). Then, with use of the detected closest waveform (i.e., using the best matching first phase spectrum selected), the film thickness of the transparent film 16 is calculated by the film thickness calculating unit 106d. As the specific method of the foregoing, first, one of the waveforms contained in the database is extracted by the error function preparing unit 106e of the film thickness calculating unit 106d, and the sum of squared difference of both the waveforms is calculated by the error function preparing unit 106e. Next, for every waveform in the spectrum change amount database 106s, the calculation is performed by the error function preparing unit 106e, and an error function whose parameter is the film thickness t is prepared by the error function preparing unit 106e. Of these, a film thickness $t_{min}$ exhibiting the smallest error function is selected by the minimum film thickness selecting unit 106f. Thus, the film thickness of the transparent film 16 is calculated.

Subsequently, in step S106, information on the result of the calculated film thickness is output from the arithmetic unit 106 to a screen of a display apparatus 120 as one example of the output apparatus, and the measurement ends.

In the following, a description will be given of the foregoing procedure, showing specific actual data as an example. In the following description, the transparent film 16 is an SiN film 16, and the substrate 17 is an Si layer 17. That is, a description will be given of a case in which the sample 103 having the SiN film 16 as thick as 91.4 nm formed on the Si layer 17 is measured, showing actual data as an example.

First, in step S101, the film thickness of the SiN film 16 is varied every 1 nm within a range of 0 to 200 nm, to obtain the nonlinear component β of the above-stated (Equation 4). Through this calculation, a database as to the case in which light whose wavelength distribution is light wavelength λ=500 to 800 nm is emitted to the SiN film 16 is created, and stored in the spectrum change amount database 106s.

Next, based on the interference waveform, from steps S102 to S104, matching of the nonlinear component extracted by the arithmetic unit 106 and the information in the spectrum change amount database 106s against each other is carried out by the film thickness calculating unit 106d of the arithmetic unit 106 for twenty times.

Figure 4A:
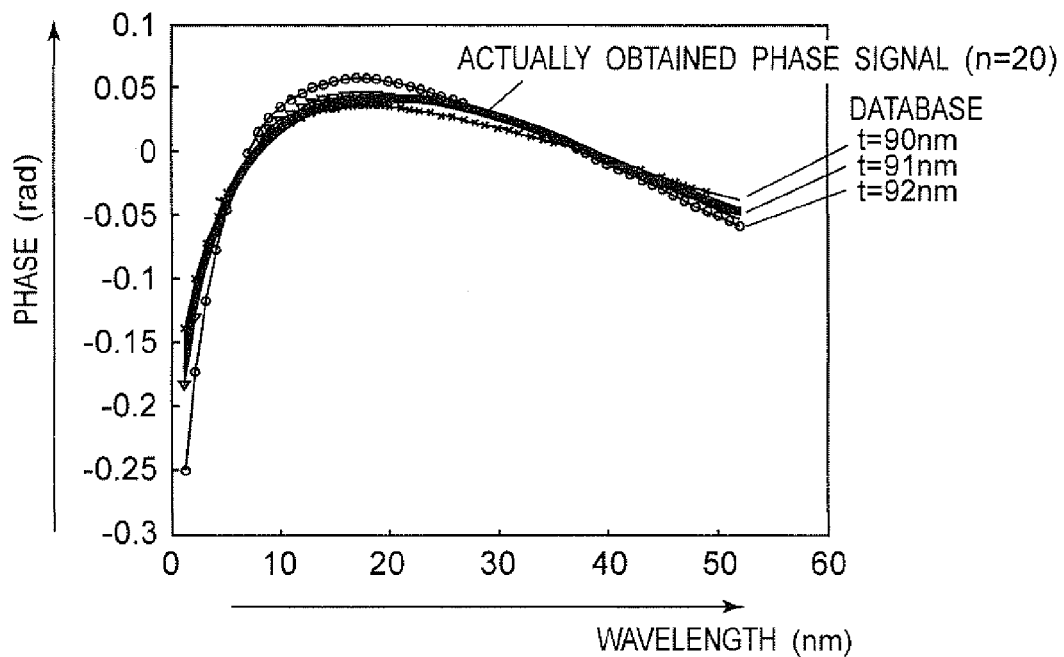
FIG. 4A is a view showing a precision verification result with a standard SiN film according to the first embodiment, in which the relationship between the wavelength and the phase is shown.
Figure 4B:
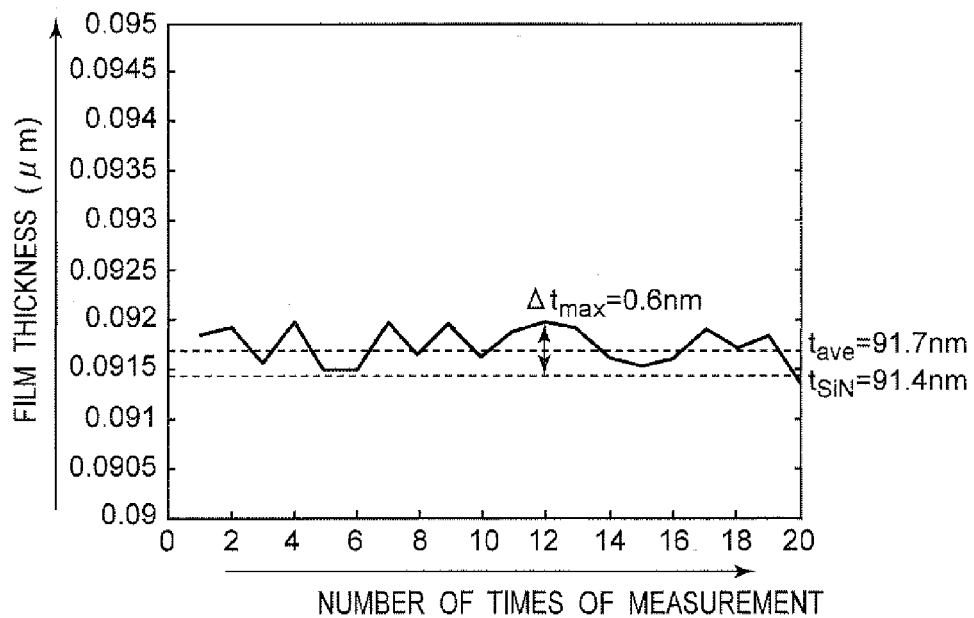
FIG. 4B is a view showing a precision verification result with a standard SiN film according to the first embodiment, in which the relationship between the number of times of measurement and the film thickness is shown.

The result of this matching is shown in FIGS. 4A and 4B. As shown in FIGS. 4A and 4B, the matching carried out for twenty times gives the following result: an average film thickness of 91.7 nm and a film thickness of ±1σ=±0.38 nm.

With such a configuration, it becomes possible to precisely measure the film-thickness distribution of a thin film even as thin as 1000 nm or less, which incurs superimposition of the interference waveform.

Second Embodiment

Figure 5:
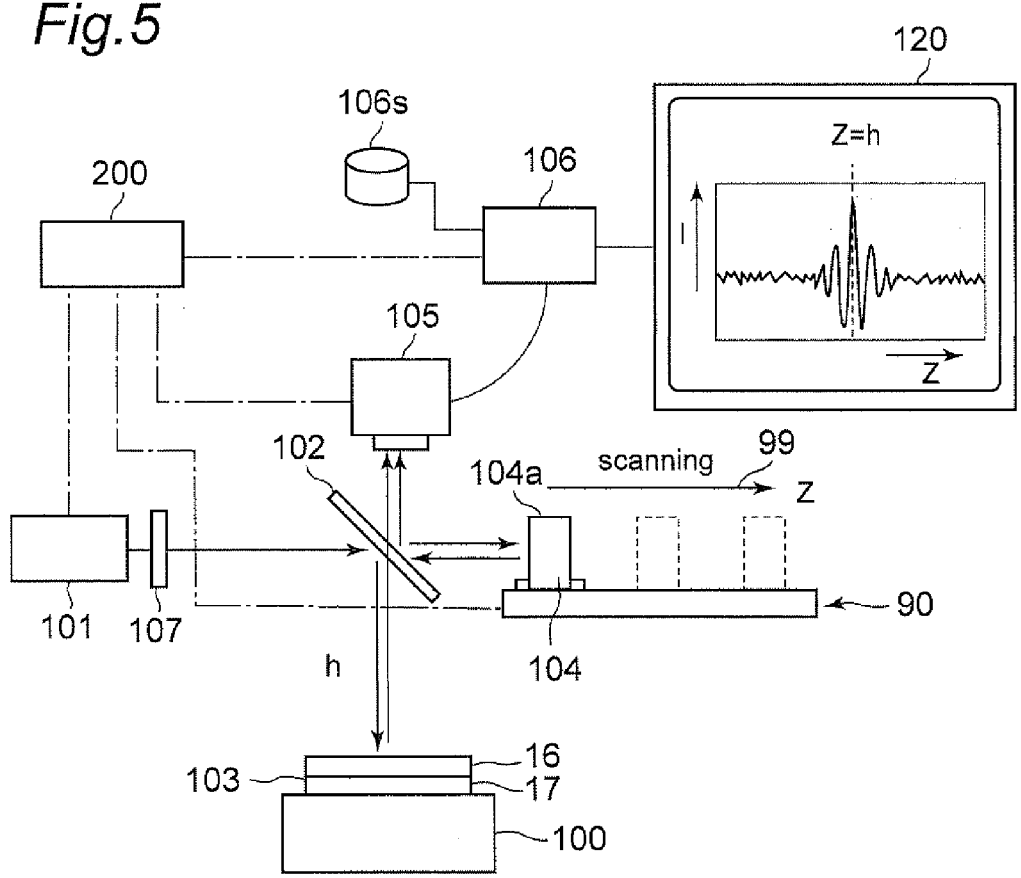
FIG. 5 is a schematic configuration view of an optical system of a white-light scanning interference system in which a wavelength filter according to a second embodiment of the present invention is inserted.

A white-light scanning interferometer 2 as one example of a film thickness measuring apparatus according to a second embodiment of the present invention is an optical system shown in FIG. 5. The second embodiment is largely different from the first embodiment in including a wavelength filter 107.

In FIG. 5, the white-light source 101 is a light source such as a halogen lamp, which emits light of a wide-band wavelength distribution. The wavelength filter 107 is a filter which is disposed between the white-light source 101 and the half mirror 102, and whose transmittance changes depending on a wavelength. The light from the white-light source 101 is caused to transmit through the wavelength filter 107, and becomes incident upon the half mirror 102 as light having the intensity spectrum, the description of which will be given later. The half mirror 102 divides the light being incident upon, and guides the divided light beams to the sample 103 and to the reference member 104, respectively. These light beams become incident upon the sample 103 and the reference member 104, respectively, and are reflected off the front surface of the sample 103 and the reference plane 104a, respectively. Thereafter, the reflected off light beams are again overlaid on each other at the half mirror 102. The overlaid light becomes incident upon the area sensor 105. At this time, while the reference plane 104a is scanned along the arrow 99 in FIG. 5 by the reference member shifting apparatus 90, an image at the reference plane 104a is captured by the area sensor 105. The light being incident upon the area sensor 105 is converted into an image by the area sensor 105, and captured by the arithmetic unit 106.

Figure 6:
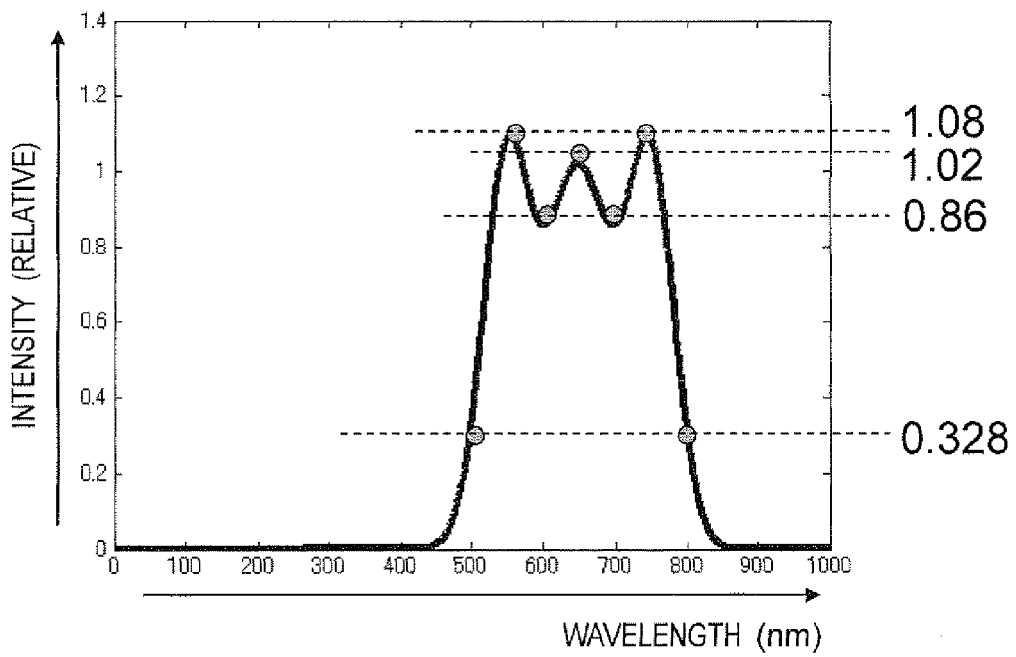
FIG. 6 is a view showing an intensity spectrum of a white-light source that can be obtained by inserting the wavelength filter according to the second embodiment.

Here, the transmittance-wavelength characteristic of the wavelength filter 107 is designed such that the white light intensity spectrum on the area sensor 105 has a plurality of peaks. The transmittance-wavelength characteristic of the wavelength filter 107 is designed in consideration of the intensity spectrum of the white-light source 101, the transmission characteristic of the optical system, and the sensitivity characteristic of the area sensor 105. For example, a case where the relationship between the wavelength and the intensity shown in FIG. 6 is established is discussed. The intensity ratio when λ=500 nm is 0.328. The intensity ratio with λ=550 nm is 1.08. The intensity ratio when λ=600 nm is 0.86. The intensity ratio when λ=650 nm is 1.02. The intensity ratio when λ=700 nm is 0.86. The intensity ratio when λ=750 nm is 1.08. The intensity ratio when λ=800 nm is 0.328.

Figure 7A:
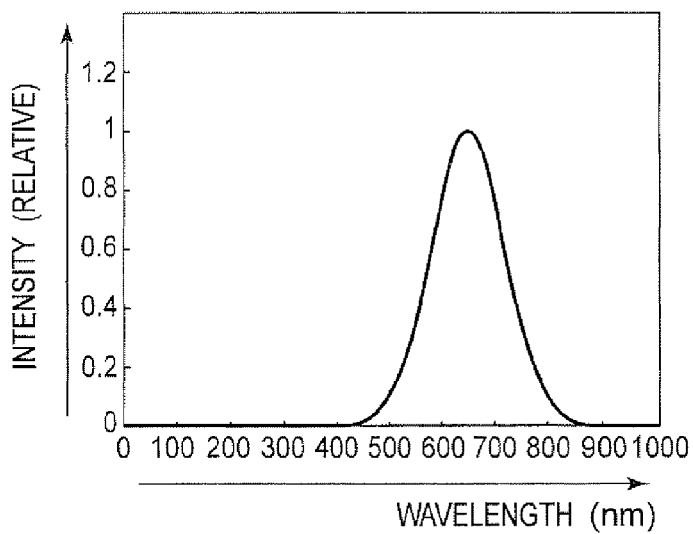
FIG. 7A is a view showing comparison of an intensity spectrum of a light source before insertion of the wavelength filter according to the second embodiment.
Figure 7B:
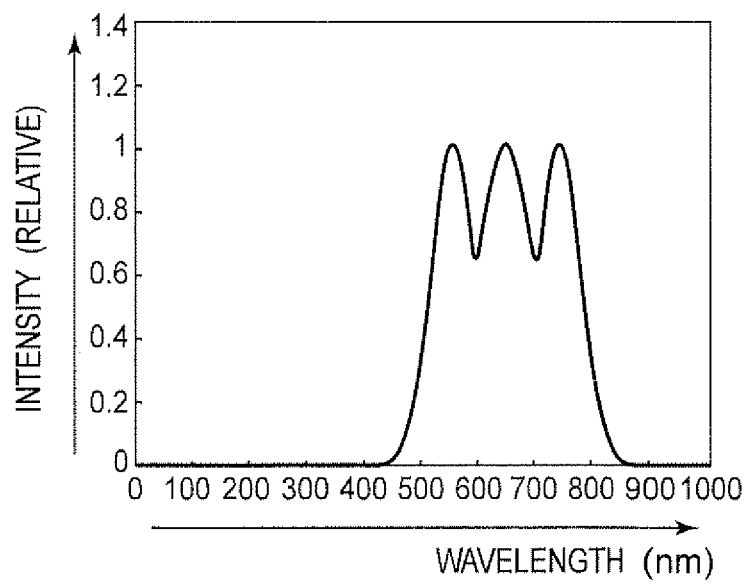
FIG. 7B is a view showing an intensity spectrum of the light source after insertion of the wavelength filter according to the second embodiment.
Figure 7C:
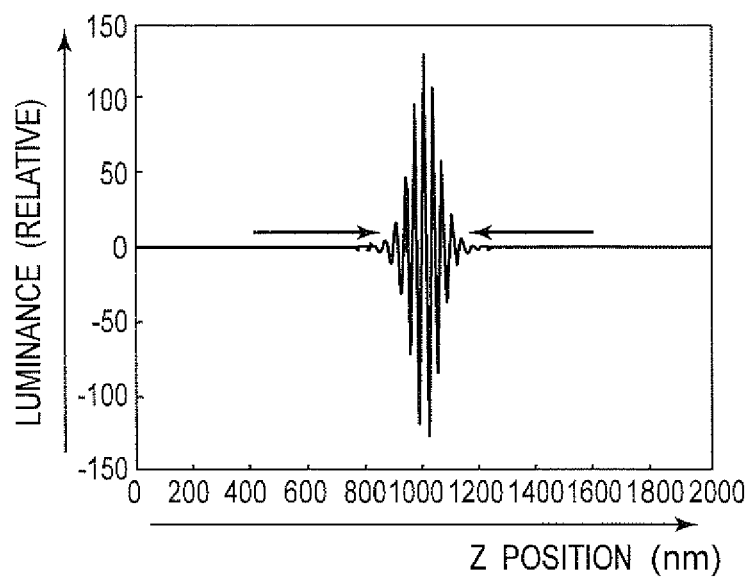
FIG. 7C is a view showing an interference waveform before insertion of the wavelength filter according to the second embodiment.
Figure 7D:
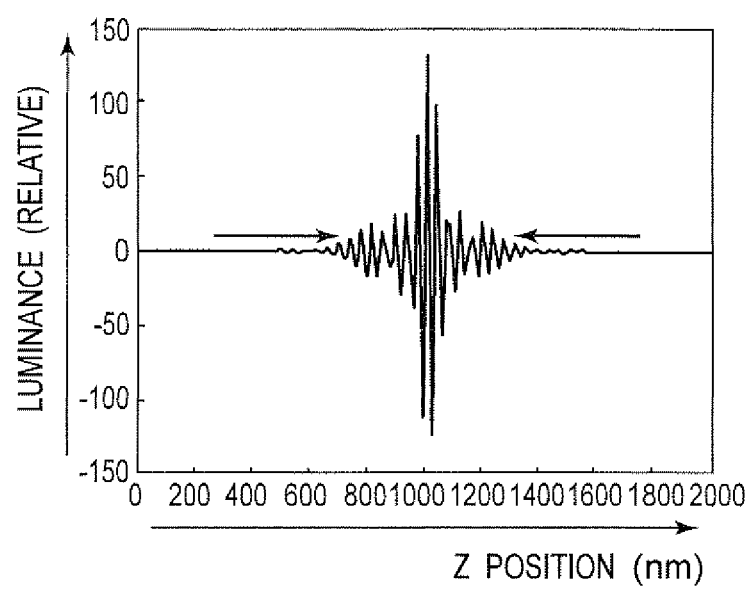
FIG. 7D is a view showing an interference waveform after insertion of the wavelength filter according to the second embodiment.

The relationship in a case where the coherence length is changed by whether or not the wavelength filter 107 is inserted is shown in FIGS. 7A to 7D. FIG. 7A is a view showing the comparison of the intensity spectrum of the light source 101 before insertion of the wavelength filter 107 according to the second embodiment. FIG. 7B is a view showing the intensity spectrum of the light source 101 after insertion of the wavelength filter 107 according to the second embodiment. FIG. 7C is a view showing the interference waveform before insertion of the wavelength filter 107 according to the second embodiment. FIG. 7D is a view showing the interference waveform after insertion of the wavelength filter 107 according to the second embodiment. As can be seen from FIGS. 7A to 7D, by the expansion of the coherence length, the reproducibility of the phase spectrum waveform under the noise environment improves. With a plurality of peaks of the present invention, the coherence length can be expanded as compared to a case with a single peak. Accordingly, in the present invention, variations in the linear component and the nonlinear component when being extracted can be reduced. Here, the linear component is a component obtained by the component extracting unit 106c by a vibration noise or an electrical noise in step S104.

The following is the comparison of the results obtained through virtual verification carried out by the arithmetic unit 106d as to the variations in the nonlinear component in the vibration noise and the electrical noise environment. The conditions are as follows.

First, the interference waveform is defined in the following (Equation 7). Here, $I_0$ is an intensity spectrum of the interference fringes. λ is the wavelength, in which λ=500 to 800 nm. h is the distance from the white-light interferometer 2 to the front surface of the sample 103, in which h=5 μm. z is the scanned distance of the reference plane 104a, in which z=0 to 10 nm. φ is the phase signal, in which $r_{01}$=0.3, $r_{12}$=0.9, t=100 nm, which are calculated using the above-stated (Equation 4). rand1 is a random variable obtained by modeling the vibration noise. rand2 is a random variable obtained by modeling the electrical noise or the like. k in (Equation 7) is a wave number represented by k=2π/λ.

$$I = \sum_\lambda I_0(\lambda)\cos(2k(z - h + rand1(z)) + \phi) + rand2(z) \quad \text{(Equation 7)}$$

Figure 8C:
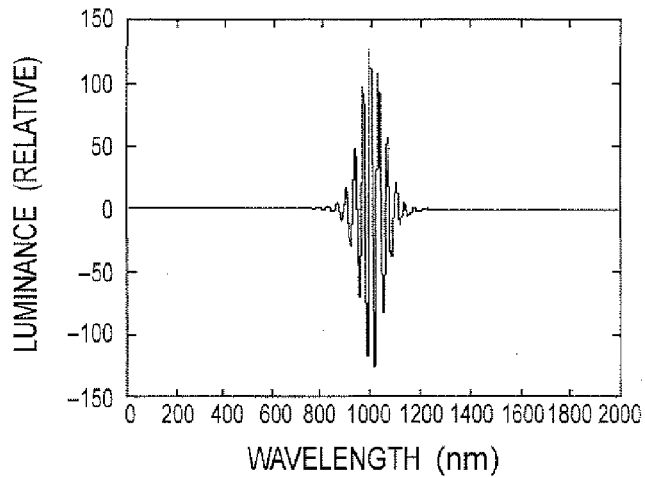
FIG. 8C is a graph of a luminance signal in which the number of peaks is one, being one of the views showing the variation evaluation result of the nonlinear component due to a change in the number of peaks of the intensity spectrum of light after transmitting through the wavelength filter according to the second embodiment.
Figure 8D:
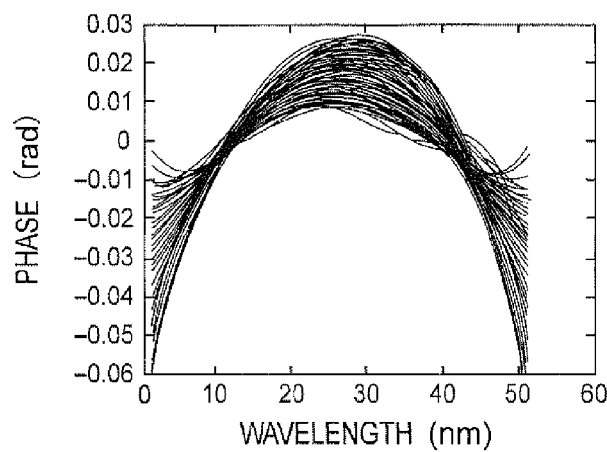
FIG. 8D is a graph of a nonlinear component in which the number of peaks is one, being one of the views showing the variation evaluation result of the nonlinear component due to a change in the number of peaks of the intensity spectrum of light after transmitting through the wavelength filter according to the second embodiment.
Figure 8E:
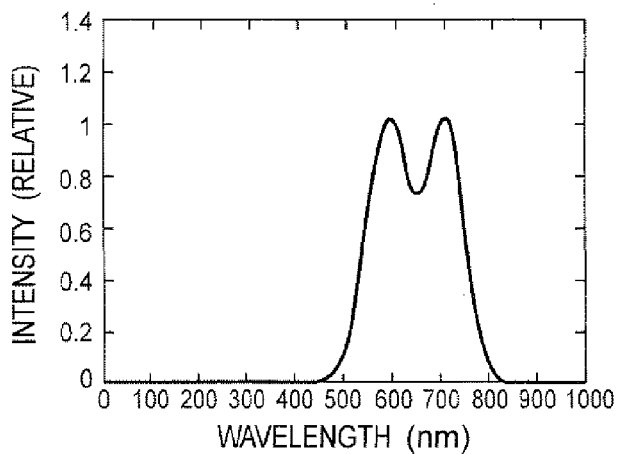
FIG. 8E is a graph of a wavelength distribution in which the number of peaks is two, being one of the views showing the variation evaluation result of the nonlinear component due to a change in the number of peaks of the intensity spectrum of light after transmitting through the wavelength filter according to the second embodiment.
Figure 8F:
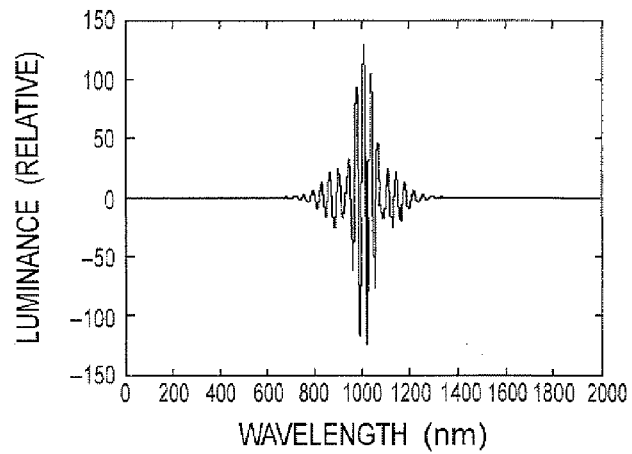
FIG. 8F is a graph of a luminance signal in which the number of peaks is two, being one of the views showing the variation evaluation result of the nonlinear component due to a change in the number of peaks of the intensity spectrum of light after transmitting through the wavelength filter according to the second embodiment.
Figure 8G:
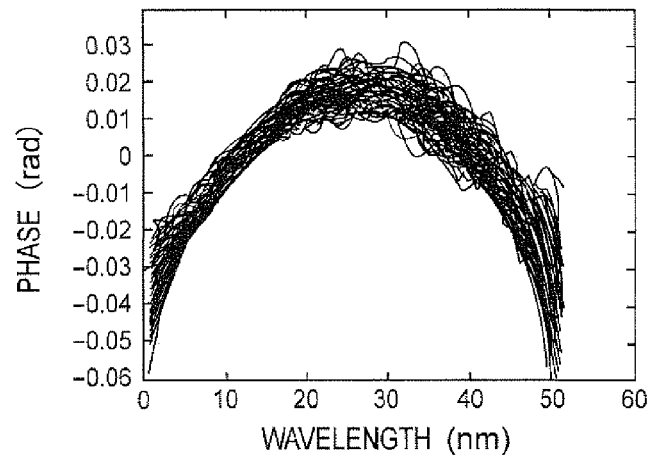
FIG. 8G is a graph of a nonlinear component in which the number of peaks is two, being one of the views showing the variation evaluation result of the nonlinear component due to a change in the number of peaks of the intensity spectrum of light after transmitting through the wavelength filter according to the second embodiment.
Figure 8H:
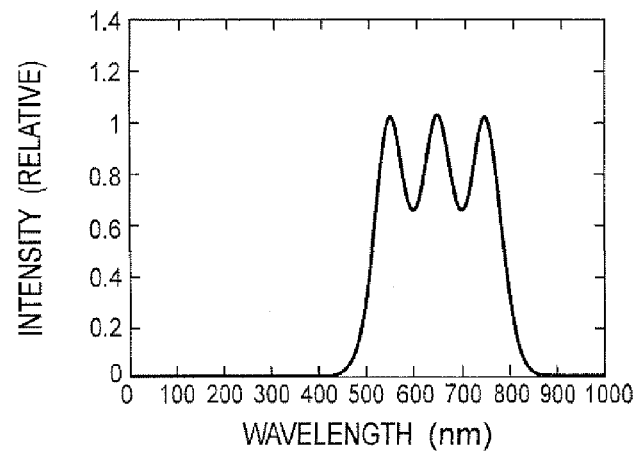
FIG. 8H is a graph of a wavelength distribution in which the number of peaks is three, being one of the views showing the variation evaluation result of the nonlinear component due to a change in the number of peaks of the intensity spectrum of light after transmitting through the wavelength filter according to the second embodiment.
Figure 8I:
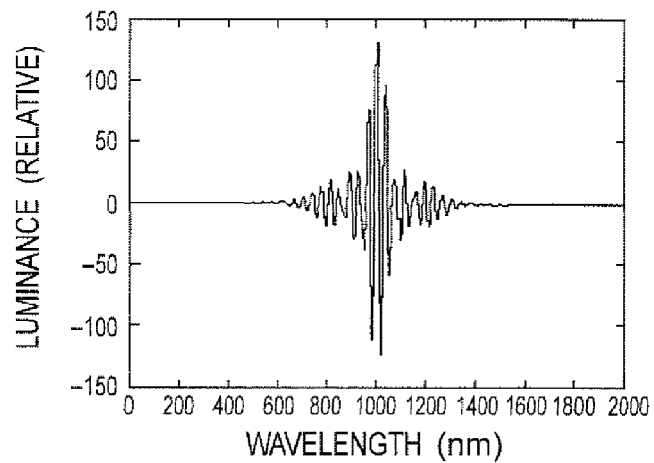
FIG. 8I is a graph of a luminance signal in which the number of peaks is three, being one of the views showing the variation evaluation result of the nonlinear component due to a change in the number of peaks of the intensity spectrum of light after transmitting through the wavelength filter according to the second embodiment.
Figure 8J:
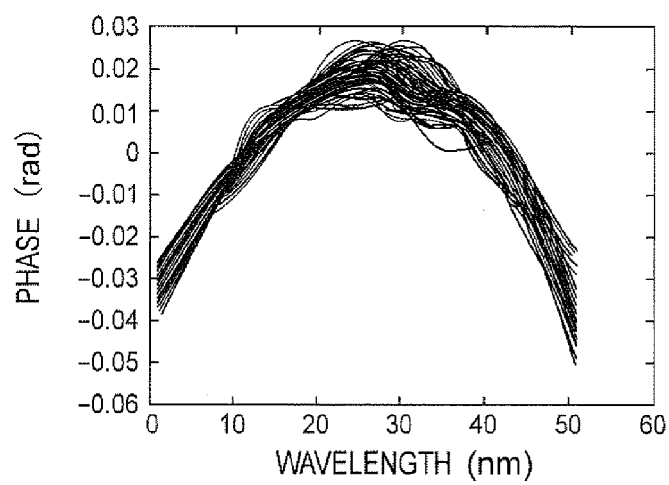
FIG. 8J is a graph of a nonlinear component in which the number of peaks is three, being one of the views showing the variation evaluation result of the nonlinear component due to a change in the number of peaks of the intensity spectrum of light after transmitting through the wavelength filter according to the second embodiment.
Figure 8K:
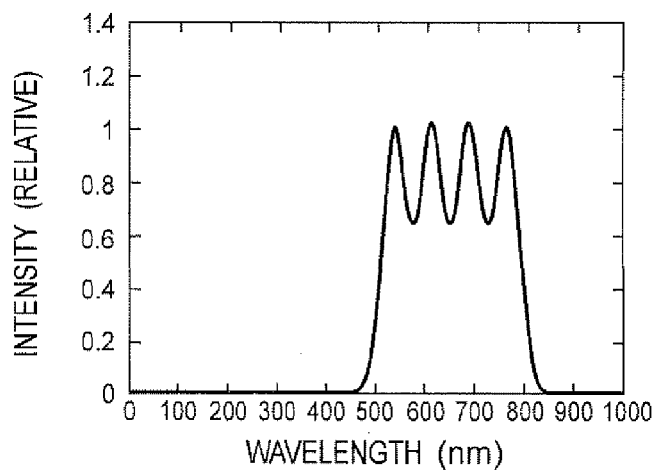
FIG. 8K is a graph of a wavelength distribution in which the number of peaks is four, being one of the views showing the variation evaluation result of the nonlinear component due to a change in the number of peaks of the intensity spectrum of light after transmitting through the wavelength filter according to the second embodiment.
Figure 8L:
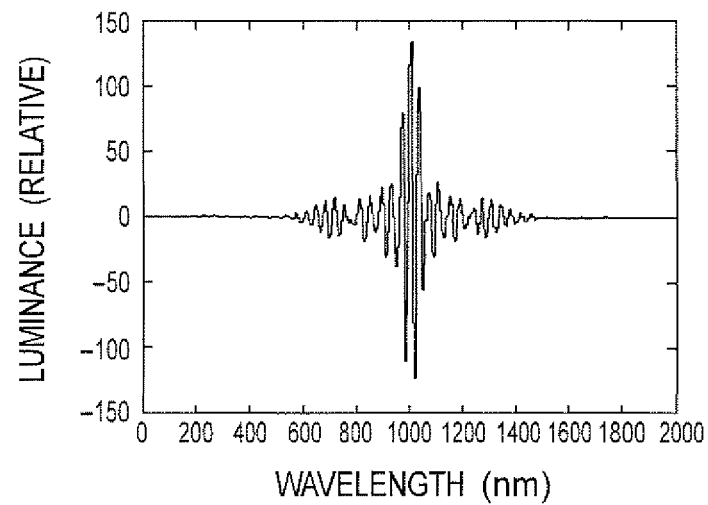
FIG. 8L is a graph of a luminance signal in which the number of peaks is four, being one of the views showing the variation evaluation result of the nonlinear component due to a change in the number of peaks of the intensity spectrum of light after transmitting through the wavelength filter according to the second embodiment.
Figure 8M:
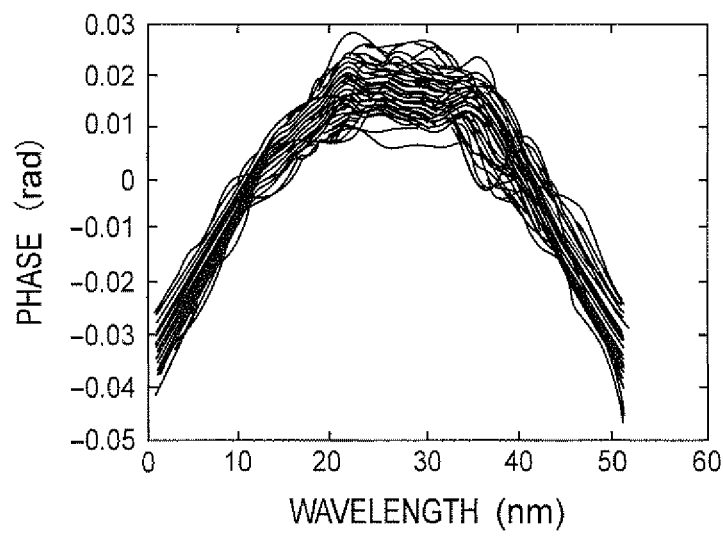
FIG. 8M is a graph of a nonlinear component in which the number of peaks is four, being one of the views showing the variation evaluation result of the nonlinear component due to a change in the number of peaks of the intensity spectrum of light after transmitting through the wavelength filter according to the second embodiment.

This interference signal I is prepared by one thousand pieces each varied by a random variable, and Fourier transform is applied thereto. The nonlinear phase component of each of the obtained interference signal I through Fourier transform is compared to each of those associated with no noise. Then, the environment resistance is evaluated by a value obtained by the sum of the thousand times of errors. The evaluation result is shown in FIGS. 8A to 8M. FIGS. 8A to 8M each show organized data where the peak of intensity spectrum of the light source is present by the number from one to four (a single peak to four peaks). The wavelength distribution in FIGS. 8B, 8E, 8H, and 8K shown in the second row in FIG. 8A represents the number of peaks of the intensity spectrum of the light source. The luminance signal in FIGS.

8C, 8F, 8I, and 8L shown in the third row in FIG. 8A represents the organized results in which, for each number of peaks, the horizontal axis represents Z position and the vertical axis represents luminance. Here, the Z position refers to the position of Z shown in FIG. 1A or 5. The nonlinear component in FIGS. 8D, 8G, 8J, and 8M shown in the fourth row in FIG. 8A represents the organized result in which, for each number of peaks, the horizontal axis represents wavelength and the vertical axis represents phase. The total sum of the error value in the fifth row in FIG. 8A is the organized total sum of the error values for each number of peaks. Here, the nonlinear component is obtained by repetition of one thousand of times in the noise environment.

Based on the evaluation of the inventors, as shown in FIGS. 8A to 8M, it can be seen that the three peaks and the four peaks show smaller variations in the shape phase components than a single peak does. It is to be noted that, it can be understood that saturation is reached with the four peaks. Accordingly, as shown in FIGS. 9A to 9K, the environment resistance is evaluated as to the three peaks, while changing the intensity of the central peak.

Figure 9B:
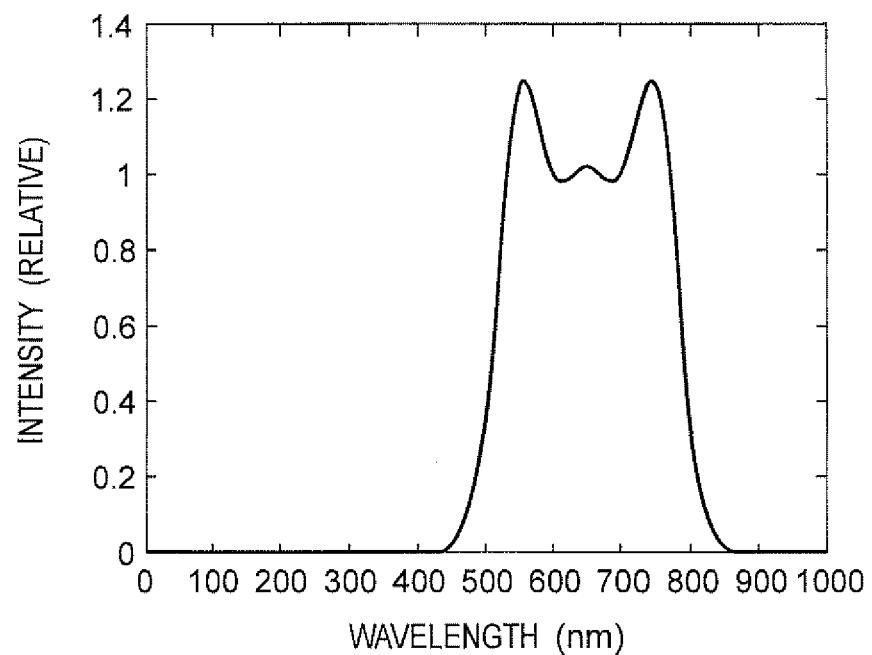
FIG. 9B is a graph of a wavelength distribution when the proportion between the central peak and the opposite sides' peaks is 81.5%, being one of the views showing the variation evaluation of the nonlinear component in the case where the proportion between the central peak and the opposite sides' peaks is changed when the intensity spectrum of light after transmitting through the wavelength filter according to the second embodiment has three peaks.
Figure 9C:
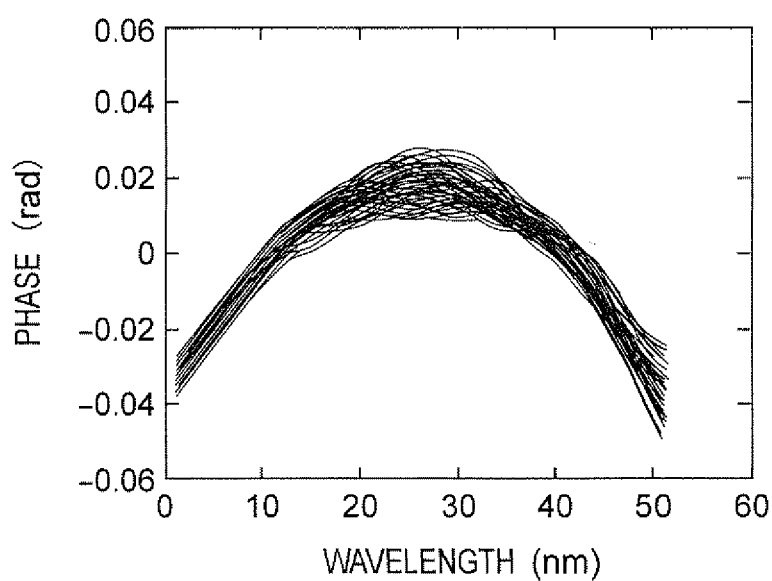
FIG. 9C is a graph of phase signal variations when the proportion between the central peak and the opposite sides' peaks is 81.5%, being one of the views showing the variation evaluation of the nonlinear component in the case where the proportion between the central peak and the opposite sides' peaks is changed when the intensity spectrum of light after transmitting through the wavelength filter according to the second embodiment has three peaks.
Figure 9D:
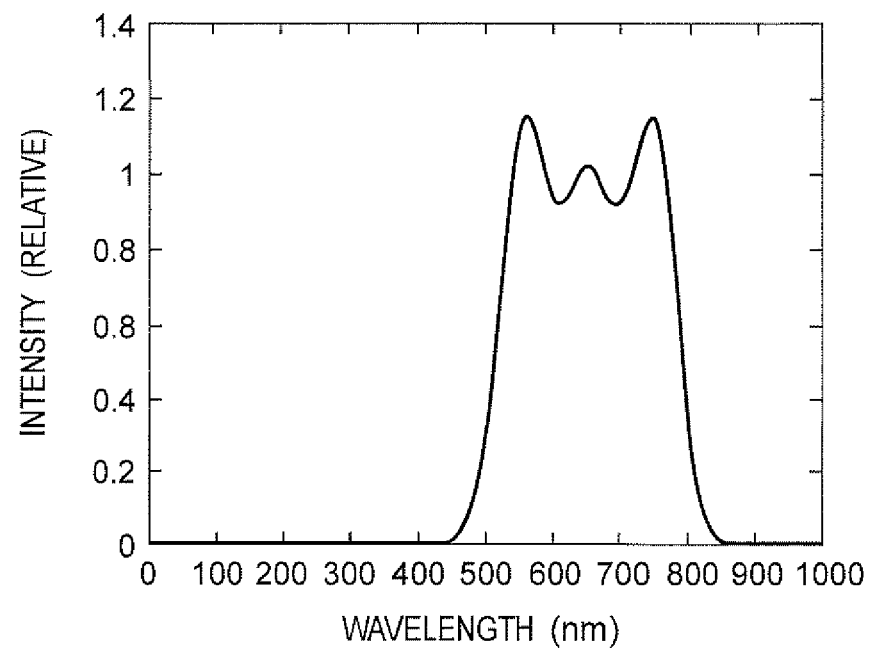
FIG. 9D is a graph of a wavelength distribution when the proportion between the central peak and the opposite sides' peaks is 88.4%, being one of the views showing the variation evaluation of the nonlinear component in the case where the proportion between the central peak and the opposite sides' peaks is changed when the intensity spectrum of light after transmitting through the wavelength filter according to the second embodiment has three peaks.
Figure 9E:
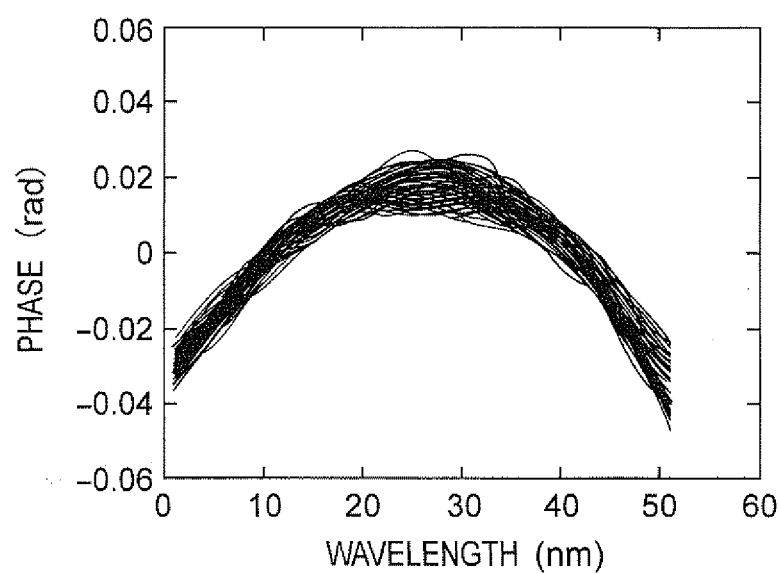
FIG. 9E is a graph of phase signal variations when the proportion between the central peak and the opposite sides' peaks is 88.4%, being one of the views showing the variation evaluation of the nonlinear component in the case where the proportion between the central peak and the opposite sides' peaks is changed when the intensity spectrum of light after transmitting through the wavelength filter according to the second embodiment has three peaks.
Figure 9F:
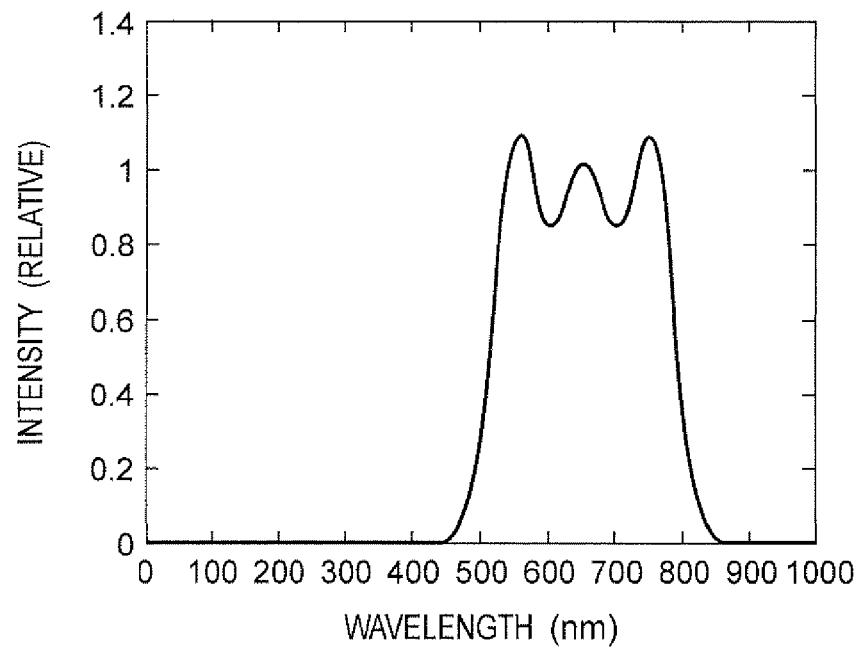
FIG. 9F is a graph of a wavelength distribution when the proportion between the central peak and the opposite sides' peaks is 93.4%, being one of the views showing the variation evaluation of the nonlinear component in the case where the proportion between the central peak and the opposite sides' peaks is changed when the intensity spectrum of light after transmitting through the wavelength filter according to the second embodiment has three peaks.
Figure 9G:
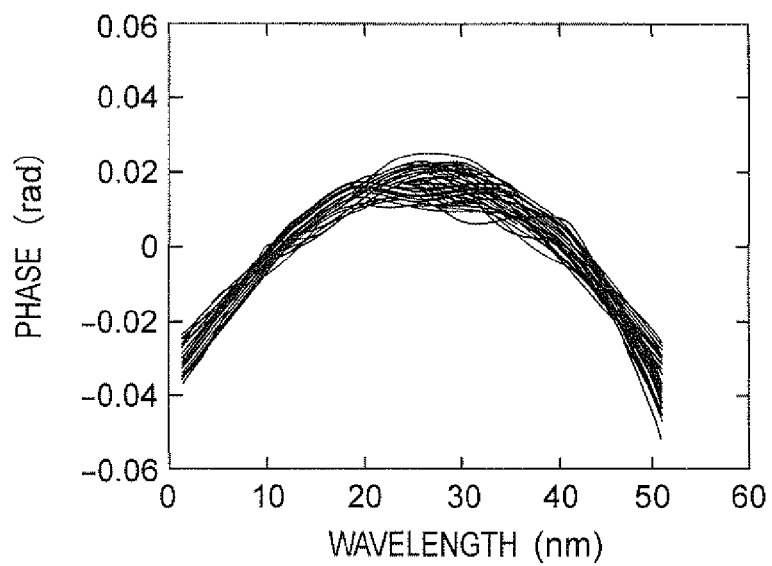
FIG. 9G is a graph of phase signal variations when the proportion between the central peak and the opposite sides' peaks is 93.4%, being one of the views showing the variation evaluation of the nonlinear component in the case where the proportion between the central peak and the opposite sides' peaks is changed when the intensity spectrum of light after transmitting through the wavelength filter according to the second embodiment has three peaks.
Figure 9H:
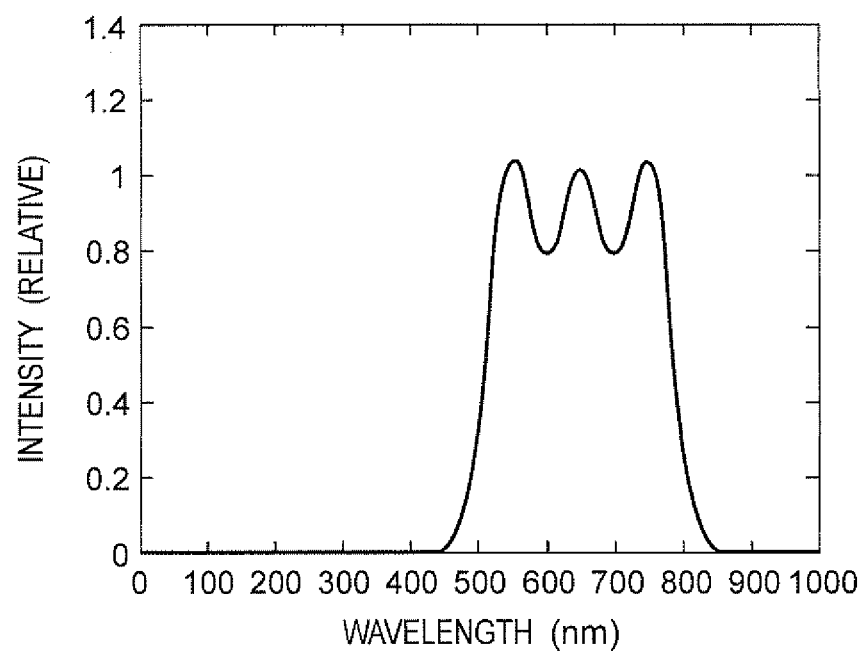
FIG. 9H is a graph of a wavelength distribution when the proportion between the central peak and the opposite sides' peaks is 96.8%, being one of the views showing the variation evaluation of the nonlinear component in the case where the proportion between the central peak and the opposite sides' peaks is changed when the intensity spectrum of light after transmitting through the wavelength filter according to the second embodiment has three peaks.
Figure 9I:
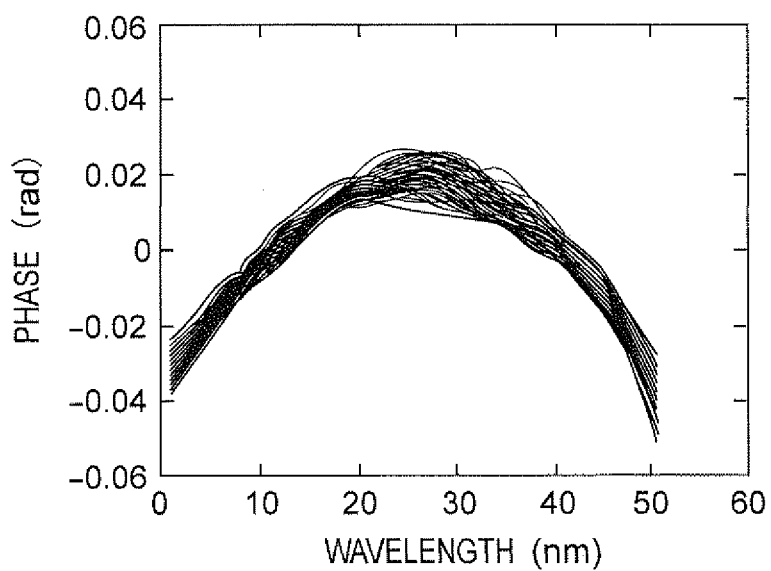
FIG. 9I is a graph of phase signal variations when the proportion between the central peak and the opposite sides' peaks is 96.8%, being one of the views showing the variation evaluation of the nonlinear component in the case where the proportion between the central peak and the opposite sides' peaks is changed when the intensity spectrum of light after transmitting through the wavelength filter according to the second embodiment has three peaks.
Figure 9J:
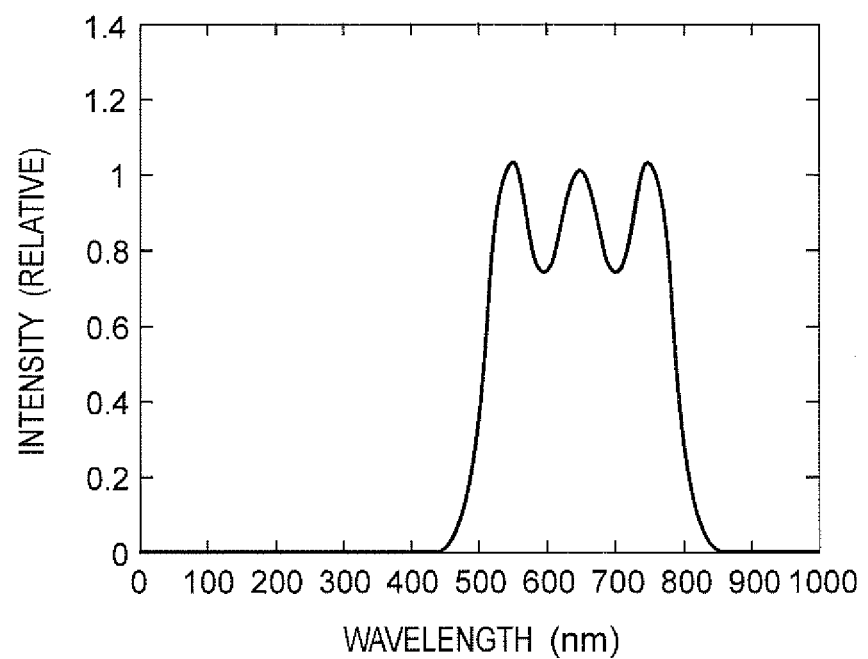
FIG. 9J is a graph of a wavelength distribution when the proportion between the central peak and the opposite sides' peaks is 99.0%, being one of the views showing the variation evaluation of the nonlinear component in the case where the proportion between the central peak and the opposite sides' peaks is changed when the intensity spectrum of light after transmitting through the wavelength filter according to the second embodiment has three peaks.
Figure 9K:
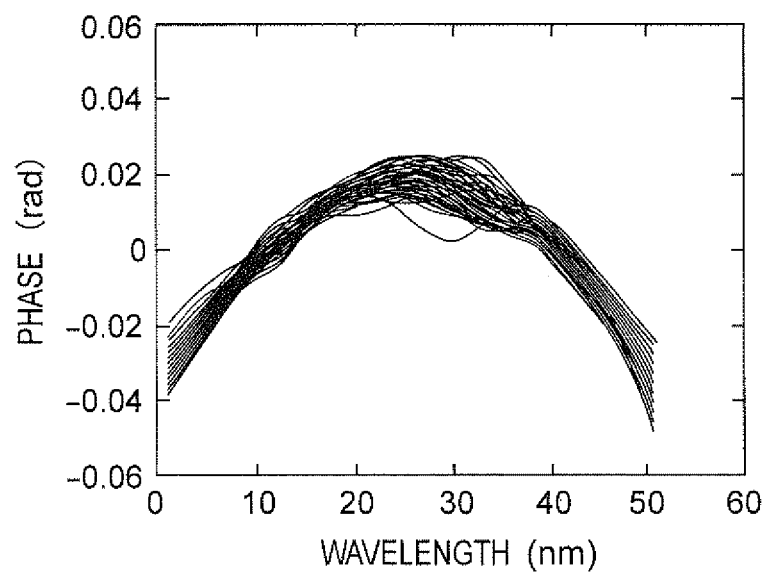
FIG. 9K is a graph of phase signal variations when the proportion between the central peak and the opposite sides' peaks is 99.0%, being one of the views showing the variation evaluation of the nonlinear component in the case where the proportion between the central peak and the opposite sides' peaks is changed when the intensity spectrum of light after transmitting through the wavelength filter according to the second embodiment has three peaks.
Figure 10:
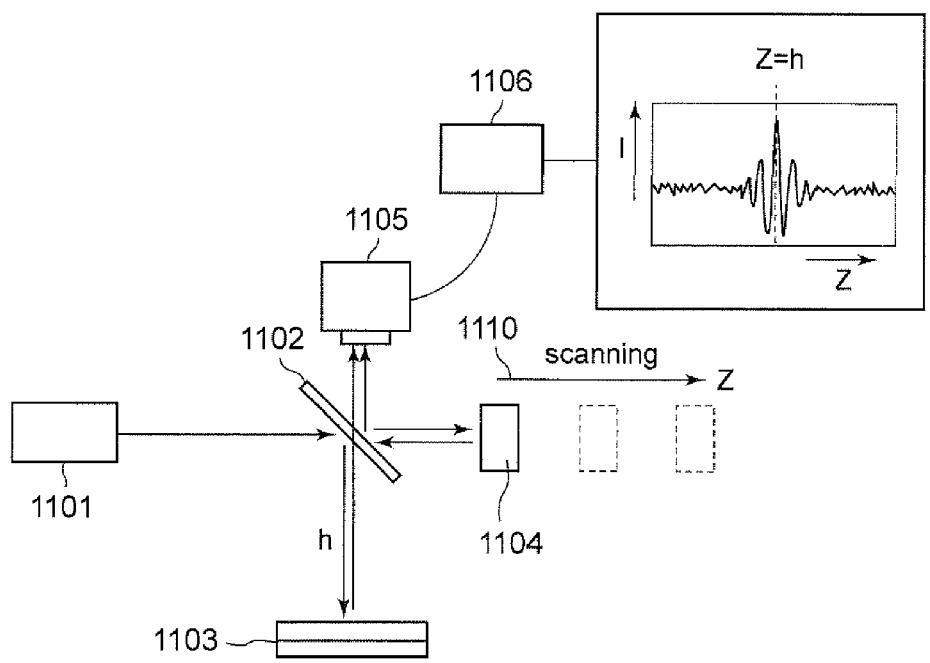
FIG. 10 is a schematic configuration view of an optical system of a conventional white-light scanning interferometer.
Figure 11:
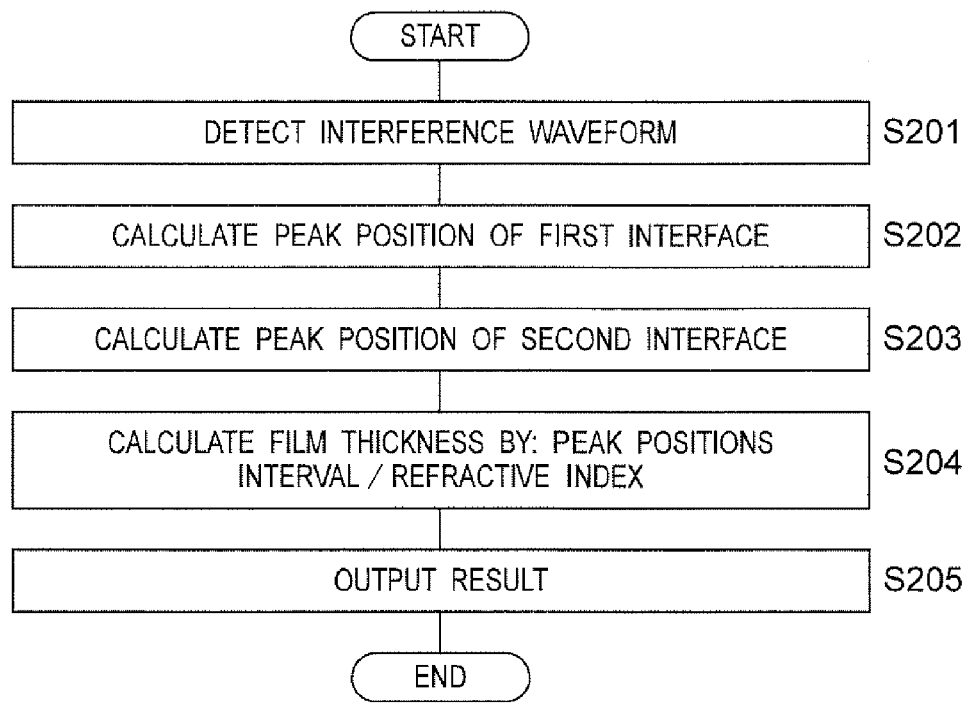
FIG. 11 is a flowchart showing a measurement procedure of a film-thickness distribution with the conventional white-light scanning interferometer.
Figure 12A:
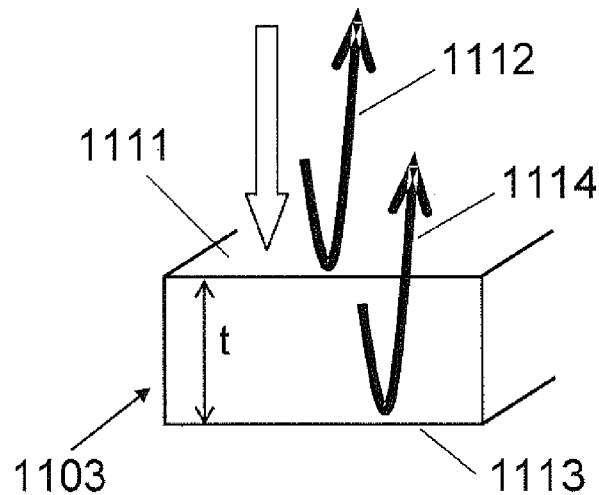
FIG. 12A is a view showing the principle of a film thickness measuring method with the conventional white-light scanning interferometer.
Figure 12B:
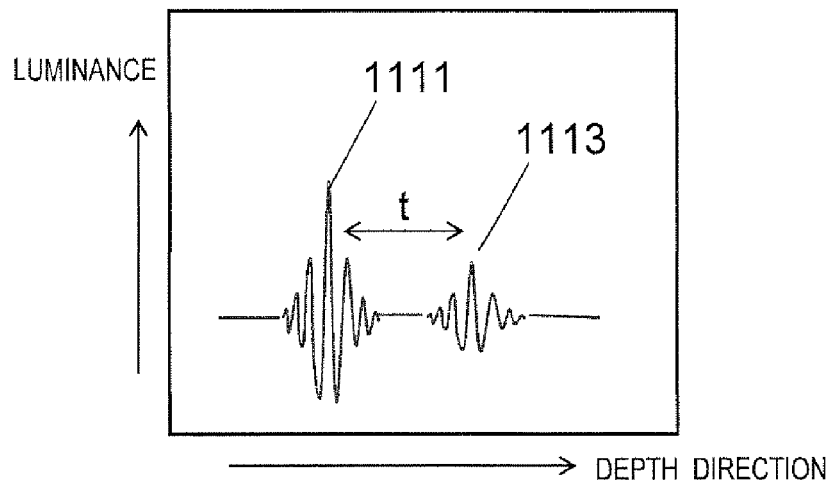
FIG. 12B is a view showing a film thickness measurement result of the conventional white-light scanning interferometer.
Figure 13A:
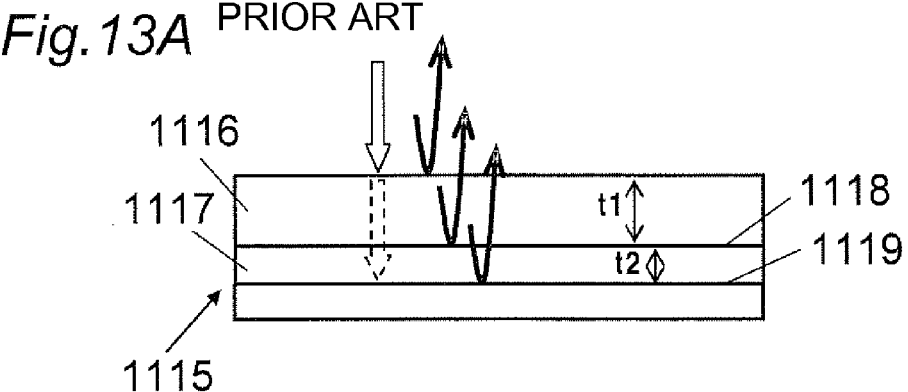
FIG. 13A is a view showing the principle of multi-layer thin film measurement with the film thickness measuring method.
Figure 13B:
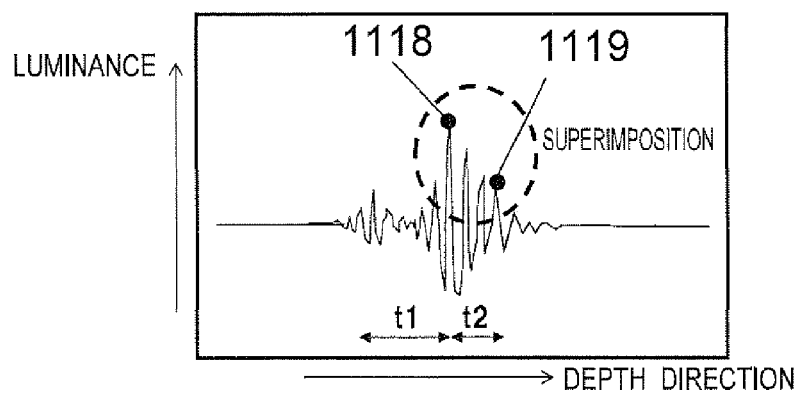
FIG. 13B is a view showing superimposition of an interference waveform in measuring the multi-layer thin film with the conventional film thickness measuring method.

FIGS. 9A to 9K are the organized results of the cases where the proportion of the intensity of the central peak to the intensity of the opposite sides' peaks is 81.5%, 88.4%, 93.4%, 96.8%, and 99.0%, respectively. The wavelength distribution of FIGS. 9C, 9E, 9G, 9I, and 9K shown in the fourth row in FIG. 9A is the organized result in which the horizontal axis represents the wavelength and the vertical axis represents the relative intensity for each proportion. The nonlinear component of FIGS. 9B, 9D, 9F, 9H, and 9J in the third row in FIG. 9A is the organized result of a phase signal for each proportion in which the horizontal axis represents the wavelength and the vertical axis represents phase. The error value in the fifth row shown in FIG. 9A is the organized result of an error value for each proportion. It is to be noted that, since no point where the evaluation result as to the nonlinear component is excellent is found where the proportion of the intensity of the central peak to the intensity of the opposite sides' peaks is equal to or more than 100.0% or equal to or less than 80.0%, the description thereof is omitted. In other words, from the viewpoint of the nonlinear component (variations in the phase signals), it is preferable that the optical filter 107 exhibits such an intensity that the intensity of the central peak of the intensity spectrum of transmitted light is greater than 80% and less than 100% to the intensity of the opposite sides' peaks. In FIGS. 9A to 9K, the minimum phase of the nonlinear component is obtained when the peak value is 93.4%. Here, the intensity ratio at the wavelength λ 500 nm of the waveform shown in FIG. 6 is 0.328. The intensity ratio at the wavelength λ=600 nm is 0.86. The intensity ratio at the wavelength λ=650 nm is 1.02. The intensity ratio at the wavelength λ=700 nm is 0.86. The intensity ratio at the wavelength λ=750 nm is 1.08. The intensity ratio at the wavelength λ=800 nm is 0.328. In this case, variations in the nonlinear component can be suppressed by 83.0% as compared to the conventional single peak.

The wavelength filter 107 according to the second embodiment is designed such that, as the transmittance-wavelength characteristic of the wavelength filter 107, the intensity spectrum of light after having transmitted through has three peaks, and that the intensity of the central peak attains 93.4% as great as the intensity of the opposite sides' peaks. Such a structure is capable of suppressing the variation degree by 83.0% as compared to the conventional structure, under application of the identical noises.

It is to be noted that, by appropriately combining any embodiment or variation out of the above-described various embodiments or variations, their respective effects can be exhibited.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

INDUSTRIAL APPLICABILITY

The film thickness measuring apparatus using interference of the present invention and the film thickness measuring method using interference are applicable to, e.g., a measurement and inspection technique for the film thickness of a semiconductor film or a transparent film of a flat panel display.

The invention claimed is:

1. A film thickness measuring apparatus using interference, comprising:
    a placement unit on which a substrate is placed, the substrate having a transparent film formed on its front surface;
    a light source that emits light to the substrate placed on the placement unit;
    a half mirror that divides the light from the light source to be emitted to the front surface of the substrate and to a reference plane, and that overlay reflected light from the front surface of the substrate and reflected light from the reference plane to form interfering light;
    an optical filter with which an intensity spectrum of transmitted light exhibits a plurality of peaks, the optical filter being disposed between the light source and the half mirror;
    an imager that images the interfering light; and
    an arithmetic unit that calculates a film thickness of the transparent film based on an imaging result obtained by the imager.

2. The film thickness measuring apparatus using interference according to claim 1, wherein
    the arithmetic unit includes:
    a spectrum change amount database that is created by previously compiling a database of a change amount of a first phase spectrum between incident light upon the transparent film and reflected light from the transparent film;
    a second phase spectrum calculating unit that calculates a second phase spectrum of the transparent film by applying Fourier transform to an interference signal of the transparent film imaged by the imager; and
    a film thickness calculating unit that selects a best matching first phase spectrum to the second phase spectrum from the spectrum change amount database, and that measures the film thickness of the transparent film using the best matching first phase spectrum.

3. The film thickness measuring apparatus using interference according to claim 1, wherein
    the optical filter is a filter with which the intensity spectrum of the transmitted light exhibits three peaks.

4. The film thickness measuring apparatus using interference according to claim 3, wherein
    with the optical filter, an intensity of a central peak of the intensity spectrum of the transmitted light is smaller than an intensity of each of opposite sides' peaks of the intensity spectrum of the transmitted light.

5. The film thickness measuring apparatus using interference according to claim 4, wherein
with the optical filter, the intensity of the central peak of the intensity spectrum of the transmitted light is more than 80% as great as and less than 100% as great as the intensity of each of the opposite sides' peaks of the intensity spectrum of the transmitted light.

6. The film thickness measuring apparatus using interference according to claim 5, wherein
with the optical filter, the intensity of the central peak of the intensity spectrum of the transmitted light is 93.4% as great as the intensity of each of the opposite sides' peaks of the intensity spectrum of the transmitted light.

7. The film thickness measuring apparatus using interference according to claim 1, wherein
the light source is a white-light source.

8. A film thickness measuring method using interference, comprising:
irradiating a light beam on a transparent film and a reference plane via an optical filter with which an intensity spectrum of transmitted light exhibits a plurality of peaks; and
measuring a thickness of the transparent film by using an interference signal of interfering light produced by interference of light from the transparent film and light from the reference plane.

9. The film thickness measuring method using interference according to claim 8, comprising:
when measuring the thickness of the transparent film by using the interference signal of the interfering light produced by the interference of the light from the transparent film and the light from the reference plane,
creating a spectrum change amount database by previously compiling a database of a change amount of a first phase spectrum between incident light upon a substrate having the transparent film formed on its front surface and reflected light from the substrate;
calculating a second phase spectrum of the transparent film by applying Fourier transform to an interference signal of interfering light produced by the interference of the light from the transparent film and the light from the reference plane; and
selecting a best matching first phase spectrum to the second phase spectrum from the spectrum change amount database, and measuring a film thickness of the transparent film using the best matching first phase spectrum.

* * * * *